United States Patent [19]

Patmore et al.

[11] 3,725,468
[45] Apr. 3, 1973

[54] CARBOXYLATION OF CYCLOPENTADIENE

[75] Inventors: Edwin L. Patmore, Fishkill; William R. Siegart; Harry Chafetz, both of Poughkeepsie, all of N.Y.

[73] Assignee: Texaco Inc., New York, N.Y.

[22] Filed: Nov. 10, 1971

[21] Appl. No.: 197,529

Related U.S. Application Data

[62] Division of Ser. No. 794,344, Jan. 27, 1969, Pat. No. 3,658,874.

[52] U.S. Cl. ............................................. 260/514 G
[51] Int. Cl. ....................... C07c 51/00, C07c 61/28
[58] Field of Search ................................. 260/514 G

[56] References Cited

UNITED STATES PATENTS 2,342,385   2/1944   Wallingford ..................... 260/405 X

OTHER PUBLICATIONS

Krauch et al., Organic Name Reactions, PP. 273–274, (1964)

Primary Examiner—Lorraine A. Weinberger
Assistant Examiner—Robert Gerstl
Attorney—K. E. Kavanagh et al.

[57] ABSTRACT

Method of carboxylating an organic compound of the group of $RC \equiv CH$, $RCH_2CN$, indene or cyclopentadiene where R is hydrocarbyl comprising contacting under anhydrous conditions in an inert atmosphere and in the presence of an inert, aprotic, dipolar, liquid solvent, said compound with a carbonated metal phenoxide, the metal phenoxide of the formula:

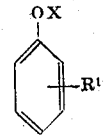

where X is sodium or potassium, $R^1$ is hydrogen or alkyl, and subsequently acidifying the resultant intermediate product to form the carboxylated product.

5 Claims, No Drawings

CARBOXYLATION OF CYCLOPENTADIENE

This is a division, of application Ser. No. 794,344 filed Jan. 27, 1969 now U.S. Pat. No. 3,658,874.

BACKGROUND OF INVENTION

The subject invention is found in the field of art relating to the introduction of a carboxylic acid group into organic compounds. In the past, in order to carboxylate the starting compounds contemplated herein utilizing carbon dioxide the contacting had to be accomplished in the presence of relatively expensive bases such as sodium, naphthalene, n-butyl lithium and sodium hydride. Due to the cost of the base, the prior art methods of carboxylating the reactants contemplated herein had only limited commercial prospects.

SUMMARY OF INVENTION

We have discovered a method of carboxylating organic compounds of the group of $RC \equiv CH$, $RCH_2CN$, indene or cyclopentadiene where R is alkyl, aryl, alkaryl and aralkyl of from one to 20 carbons consisting essentially of contacting said organic compounds under anhydrous conditions in an inert atmosphere and in the presence of an inert, aprotic, dipolar, liquid solvent with the reaction product of carbon dioxide and a base of the formula:

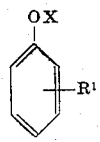

where X is sodium or potassium and $R^1$ is hydrogen or alkyl of from one to 12 carbons and subsequently acidifying the resultant reaction mixture to recover the carboxylic acid product.

The discovery that the carbonated metal phenoxide salts facilitate the production of carboxylated products in high yields has rendered a base catalyzed carboxylation process for the starting materials contemplated herein commercially feasible since the carbonated phenoxide is many times less expensive than previous bases employed. Further, the subject method has several advantages over the method set forth in our co-assigned, copending application Ser. No. 784,901, filed Dec. 18, 1968, now U.S. Pat. No. 3,595,907, wherein carboxylation occurs by contacting the organic reactant with carbon dioxide in the presence of uncarbonated metal phenoxide followed by acidification. These several advantages are a substantial reduction in the amount of carbon dioxide required, a better control of the reaction and with some reactants superior yields.

DETAILED DESCRIPTION OF THE INVENTION

Specifically, the invention relates to contacting under anhydrous conditions and in an inert atmosphere an active hydrogen containing reactant of the group of $R-C \equiv CH$, $RCH_2CN$, indene or cyclopentadiene with a carbonated metal phenoxide in the presence of an inert, aprotic, dipolar, liquid solvent at a temperature between about 0° and 150° C. under a pressure of between 1 and 200 atmospheres and in an inert atmosphere utilizing a mole ratio of said carbonated metal phenoxide to said organic reactant of between about 2:1 and 20:1 and subsequently acidifying the resultant mixture to respectively form carboxyl compounds of the group of $R-C \equiv COOH$, $$RCHCN \atop | \atop COOH$$

indene-3-carboxylic acid and tricyclo [5.2·1.0$^{2,6}$] deca-3,8-diene-4,9-dicarboxylic acid. The carbonated metal phenoxide is prepared by contacting with an excess of carbon dioxide a metal phenoxide of the formula:

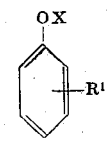

where X and $R^1$ are as heretofore defined at a temperature between about 0° and 150° C. under a carbon dioxide pressure of between about 1 and 200 atmospheres and in the presence of inert aprotic, dipolar, liquid solvent. The reaction of the organic reactant and carbonated phenoxide under preferred conditions takes place at a temperature between 25° and 50° C., at a carbon dioxide pressure of between 1 and 25 atmospheres utilizing a mole ratio of said carbonated phenoxide to said organic compound of between about 4:1 and 10:1. By the term "excess of carbon dioxide to metal phenoxide" it is hereinbefore and hereinafter intended to denote a mole ratio of at least about 2:1 and up to 100:1 and more.

The preparation of the carbonated metal phenoxide reactant under preferred conditions takes place at a temperature between 25° and 50° C., a carbon dioxide pressure between 1 and 25 atmospheres, a mole ratio of carbon dioxide to phenoxide of between about 2:1 and 10:1 and in the presence of an inert, aprotic, dipolar, liquid solvent.

Acidification desirably takes place at a temperature between about 5° and 35° C. to a pH between about 1 and 3 to convert the intermediate product to the desired carboxylic acid derivative. A pH up to about 6 is also suitable.

The carboxylic acid products are recovered from the acidified mixture by standard means such as selective extraction, distillation, decantation and combinations thereof.

By the term "anhydrous" a water content less than 0.5 wt. percent is intended.

The carbonated metal phenoxide reactant is in essence a complex mixture of the phenyl carbonate salt (I) represented by the formula:

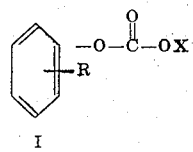

I the complex of the phenoxide salt with carbon dioxide (II) represented by the formula:

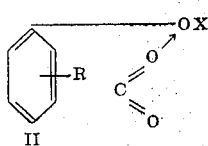

II and an unidentified material III where X and R are as heretofore defined. Compounds I and III are in nearly equal amounts and were present in slightly larger amounts than Compound II.

Examples of the organic reactant compounds contemplated herein are phenylacetylene, benzyl cyanide, acetonitrile, hexanenitrile, acetylene, 1-butyne and 1-hexyne.

Examples of the carbonated reactants are the carbonated sodium and potassium salts of phenol, methylphenol, t-octylphenol, nonylphenol and dodecylphenol.

Specific examples of the acidifying acids contemplated herein are the mineral acids such as hydrochloric acid, nitric acid, sulfuric acid and hydrobromic acid in aqueous concentrations ranging from 4 to 96 wt. percent.

Specific examples of the liquid solvents contemplated herein for the preparation of the carbonated phenoxide salt and the carbonated salt-organic reactant intermediate product are N,N-dimethylformamide, hexamethylphosphoramide, dimethyl sulfoxide, diphenyl sulfoxide, dimethyl sulfone and N,N-dimethyl acetamide. The quantity of solvent employed advantageously constitutes between about 50 and 90 weight percent of the reaction mixture. Further, any inert, aprotic, dipolar, liquid (under conditions of reaction) solvent is suitable.

Examples of gases which can form the inert atmosphere are nitrogen, helium and argon.

Specific examples of the carboxylic acid products contemplated herein are indene-3-carboxylic acid, tricyclo-$[5.2.1.0^{2,6}]$ deca-3,8-diene-4,9-dicarboxylic acid, phenylpropiolic acid, alpha-phenylcyanoacetic acid, alpha-cyanohexoic acid, 2-butynoic acid, 2-propynoic acid and 2-hexynoic acid.

One of the important aspects of the method of the invention is the maintenance of anhydrous conditions during the preparation of the carbonated phenoxide salt and the carbonated salt-organic reactant intermediate. If such conditions are not observed, little or no yield of salt reactant and intermediate are obtained resulting in no yield of desired carboxylic product. Another important aspect of the method of the invention is the employment of a carbonated phenoxide salt to organic reactant of at least about 2:1. Lesser ratios result in little or no carboxylic product.

The following examples further illustrate the invention but are not to be considered as limitations thereof.

EXAMPLE I

This example illustrates the preparation of alpha-phenylcyanoacetic acid from benzyl cyanide.

Sodium phenoxide (25.6 grams, 0.24 mole) and dimethylformamide (100 mls.) were charged to a three-necked, 250 mls. flask equipped with a magnetic stirring bar, thermometer, gas sparger and water cooled condenser fitted with an expansion bulb. The exit of the expansion bulb was connected to a mercury bubbler to protect the system from the atmosphere. Dry carbon dioxide was bubbled into the clear brown solution. The temperature rose from 33° to 46° C. and the contents of the flask became a milky, grey-brown mixture. After 20 minutes the temperature dropped to 34° C. Foaming was observed at this point. Excess carbon dioxide was bubbled into the solution and after approximately an hour the mixture started to clear and the solids dissolved. Carbon dioxide was passed into the reaction mixture for a total of 3 hours. Carbon dioxide blowing was discontinued and replaced by a stream of dry nitrogen (sequentially passed through concentrated sulfuric acid and then soda lime). Benzyl cyanide (7 grams, 0.06 mole) was charged to the flask with an additional 15 mls. of dimethylformamide. The mixture was stirred for 3 hours under nitrogen. The nitrogen was removed and the system closed and the mixture allowed to stand overnight.

The reaction mixture was poured into a beaker containing 100 grams of ice and 100 mls. of concentrated HCl. The aqueous acidic layer was extracted with ether (6×100 mls.). The combined ether layers were extracted with 10 percent sodium bicarbonate (5×100 mls.). The bicarbonate extracts were cooled in an ice bath and made acidic with 6 molar hydrochloric acid. The acidified solution was extracted with ether (6×100mls.). The combined ether extracts were washed with water (75 mls.) and dried over anhydrous sodium sulfonate and over anhydrous calcium sulfate. The solution was filtered and the ether removed on the rotary evaporator to give 7.5 grams of acidic material which solidified upon standing. An infrared spectral analysis confirmed the product as alpha-phenylcyanoacetic acid.

The crude alpha-phenylcyanoacetic acid was recrystallized from 55 mls. of benzene and 150 mls. of petroleum ether and the yield of purified acetic acid product was determined to be 64 mole percent. Elemental analysis of the recrystallized product gave the following: Found: wt. percent C — 66.9; wt. percent H — 4.4; wt. percent N — 8.4; Calc: wt. percent C = 67; wt. percent H = 4.3; wt. percent N = 8.69.

The reactions of the above were conducted under atmospheric pressure.

EXAMPLE II

This example illustrates the criticality of employing at least about a 2:1 mole ratio of carbonated phenoxide to organic reactant.

The procedure of Example I was essentially repeated with the exception that 3.5 grams (0.03 mole) sodium phenoxide 75 mls. dimethylformamide and carbon dioxide were first reacted to form the intermediate and subsequently 3.5 grams (0.03 mole) benzyl cyanide were added and the mixture was stirred, acidified and worked up in the usual manner. No carboxylic acid material was isolated.

EXAMPLE III

This example illustrates the criticality of maintaining an anhydrous reaction basically utilizing the general method and apparatus set forth in Example I with the following exceptions: Carbon dioxide was bubbled into a solution of sodium phenoxide (28.3 grams, 0.24 mole) and dimethylformamide (100 mls.) for 10 minutes. Then several drops of water about (0.09 grams) were added and an immediate cloudiness followed by a solid formation was observed. Carbon dioxide flow was maintained for a total of 3 hours. Carbon dioxide was discontinued, benzyl cyanide (7 grams, 0.06 mole) was added and the system closed to the atmosphere. The mixture was allowed to stir for approximately 3 hours and then allowed to stand overnight. The reaction mixture was then acidified and worked up. No carboxylic acid product was recovered.

EXAMPLE IV

This example illustrates the desirability of having an extended reaction time between the sodium phenoxide and carbon dioxide to form the carbonated intermediate.

The procedure employed was essentially that of Example I. The reactive carboxylated phenoxide was prepared by bubbling an excess of carbon dioxide into a solution of sodium phenoxide (13.9 grams, 0.12 mole) and dimethylformamide (75 mls.) for approximately 24 minutes rather than the 3 hour period in Example I (32°–46° C.). The carbon dioxide stream was then discontinued and the sparger replaced by a plug. Then benzyl cyanide (3.5 grams, 0.03 mole) was added and the mixture was stirred for 3 hours. The mixture was allowed to stand overnight, acidified and worked up to give a crude acidic product which was recrystallized from benzene (35 mls.)-petroleum ether (75 mls.) to give 2.43 grams alpha-phenylcyanoacetic acid in a yield of 50 percent which is somewhat less than the 64 percent yield of Example I.

EXAMPLE V

This example illustrates the preparation of phenylpropiolic acid from phenylacetylene.

Utilizing the general procedure and apparatus described in Example I with the following changes:

Carbon dioxide was bubbled into a solution of sodium phenoxide (13.0 grams, 0.12 mole) and dimethylformamide (75 mls.) for 3 hours at 28°–35° C. Then phenylacetylene (6.2 grams, 0.06 mole) under nitrogen was added and the mixture stirred 3 hours under nitrogen. The nitrogen stream was discontinued, the system closed to the atmosphere, and the reaction mixture allowed to stand overnight. The product mixture was acidified and worked up to give 2 grams of crude phenylpropiolic acid representing a mole percent yield of 23. A recrystallized sample of phenylpropiolic acid (from distilled water) gave white crystals, m.p. 136°–137° and elemental analysis gave the following: Found: wt. percent C = 74.0, wt. percent H = 4.4; Calc.: wt. percent C = 73.97, wt. percent H = 4.1.

EXAMPLE VI

This example further illustrates the preparation of phenylpropiolic acid from phenylacetylene and when the yield is compared to Example V this demonstrates the preferability of a 4:1 ratio of carbonated phenoxide to phenylacetylene reactant as opposed to the 2:1 ratio used in Example V.

The procedure of Example V was essentially repeated with the exception that the carbonated intermediate was formed by the reacting 27.8 grams (0.24 mole) of sodium phenoxide with excess carbon dioxide in 100 mls. dimethylformamide. In the subsequent reaction of the carbonated intermediate 6.2 grams (0.06 mole) of phenylacetylene was employed. Phenylpropiolic acid in an amount of 4.5 grams was recovered representing a yield of 51 percent or more than double that of Example V.

EXAMPLE VII

This example illustrates the preparation of indene-3-carboxylic acid from indene.

The procedure and apparatus employed was that in general described in Example I. The carboxylated sodium phenoxide intermediate was prepared by bubbling excess carbon dioxide into a solution of sodium phenoxide (13.9 grams, 0.12 mole) and dimethylformamide (100 mls.) for 3 hours. The temperature ranged from 20° to 38° C. The carbon dioxide was replaced by dry nitrogen. Then indene (3.5 grams, 0.03 mole) was added and the mixture stirred for approximately 3 hours under nitrogen. The nitrogen flow was discontinued, the system closed to the atmosphere, and the reaction mixture allowed to stand overnight. The mixture was acidified and was worked up to give 4.7 grams of crude acidic material.

The crude acidic material was recrystallized from benzene to give 1.65 grams of a product whose infrared and nuclear magnetic resonance spectra were comparable to those of indene-3-carboxylic acid. This represented a yield of 34 mole percent. Elemental analysis of the recovered indene-3-carboxylic acid Found: wt. percent C — 75; wt. percent H — 5; Calc.: wt. percent C — 75; wt. percent H — 5.

EXAMPLE VIII

This example illustrates the preparation of Thiele's acid, that is, tricyclo [5.2·1.0$^{2,6}$] deca-3,8-diene-4,9-dicarboxylic acid.

The procedure and apparatus broadly was that employed in Example I. Carbon dioxide was bubbled into a solution of sodium phenoxide (13.9 grams, 0.12 mole) and dimethylformamide (75 mls.) for 3 hours to prepare the reactive carboxylated phenoxide. The temperature ranged from 21°–42° C. The carbon dioxide stream was discontinued, the system was closed to the atmosphere and cyclopentadiene (4 grams, 0.06 mole) was added. The mixture was stirred for 3 hours and washed to give 2.5 grams of Thiele's acid having a melting point of 191°–193° C. The product was confirmed by infrared analysis. The yield basis cyclopentadiene was 38 mole percent.

We claim:

1. A method of producing tricyclo[5.2·1.0$^{2,6}$] deca-3,8-diene-4,9-dicarboxylic acid comprising contacting a carbonated metal phenoxide with cyclopentadiene under anhydrous conditions and an inert atmosphere in a mole ratio of said carbonated phenoxide to said cyclopentadiene of between about 2:1 and 20:1 at a temperature between about 0° and 150° C. under a pressure of between about 1 and 200 atmospheres, subsequently acidifying the resultant reaction product to a pH of less than about 6 and recovering said tricyclo[5.2$^{·2,6}$]deca-3,8-diene-4,9-dicarboxylic acid from the acidified mixture, said carbonated phenoxide being prepared by contacting under anhydrous conditions a base of the formula:

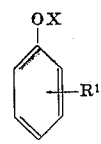

where X is sodium or potassium and $R^1$ is hydrogen or alkyl of from one to 12 carbons with carbon dioxide in a mole ratio of carbon dioxide to said base of at least about 2:1 at a temperature between about 0° and 150° C under carbon dioxide pressure of between about 1 and 200 atmospheres, and both said contacting steps being conducted in the presence of an inert, aprotic, dipolar, liquid solvent.

2. A method in accordance with claim 1 wherein said solvent is present in an amount between about 50 and 90 wt. percent of the reaction mixture.

3. A method in accordance with claim 2 wherein said acidifying is conducted to a pH of between about 1 and 3.

4. A method in accordance with claim 3 wherein said solvent is dimethyl formamide and acidifying is conducted with hydrochloric acid.

5. A method in accordance with claim 3 wherein said base is sodium phenoxide.

* * * * *